United States Patent
Pfeil

(10) Patent No.: US 12,400,111 B2
(45) Date of Patent: Aug. 26, 2025

(54) COMPRESSING A DEEP NEURAL NETWORK

(71) Applicant: Robert Bosch GmbH, Stuttgart (DE)

(72) Inventor: Thomas Pfeil, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 937 days.

(21) Appl. No.: 16/998,571

(22) Filed: Aug. 20, 2020

(65) Prior Publication Data
US 2021/0065010 A1 Mar. 4, 2021

(30) Foreign Application Priority Data
Aug. 28, 2019 (DE) .................. 102019212912.9

(51) Int. Cl.
*G06N 3/08* (2023.01)
*G06F 18/21* (2023.01)
*G06N 3/084* (2023.01)
*G06N 5/046* (2023.01)

(52) U.S. Cl.
CPC ........... *G06N 3/08* (2013.01); *G06F 18/2163* (2023.01); *G06N 3/084* (2013.01); *G06N 5/046* (2013.01)

(58) Field of Classification Search
CPC ............................... G06N 3/084; G06N 5/046
See application file for complete search history.

(56) References Cited

FOREIGN PATENT DOCUMENTS

DE 102018220608 A1 3/2020

OTHER PUBLICATIONS

Yao, S., Zhao, Y., Zhang, A., Su, L., & Abdelzaher, T. (Nov. 2017). Deepiot: Compressing deep neural network structures for sensing systems with a compressor-critic framework. In Proceedings of the 15th ACM conference on embedded network sensor systems (pp. 1-14). (Year: 2017).*
Alvarez, R., Prabhavalkar, R., & Bakhtin, A. (2016). On the efficient representation and execution of deep acoustic models. arXiv preprint arXiv:1607.04683. (Year: 2016).*
Gu, J., Wang, Z., Kuen, J., Ma, L., Shahroudy, A., Shuai, B., . . . & Chen, T. (2018). Recent advances in convolutional neural networks. Pattern recognition, 77, 354-377. (Year: 2018).*
Liu, Z., Sun, M., Zhou, T., Huang, G., & Darrell, T. (2019). Rethinking the value of network pruning. arXiv preprint arXiv:1810. 05270. (Year: 2019).*
Yamanaka, J., Kuwashima, S., & Kurita, T. (2017). Fast and accurate image super resolution by deep CNN with skip connection and network in network. In Neural Information Processing: 24th International Conference, ICONIP 2017, Guangzhou, China, Nov. 14-18, 2017 (pp. 217-225) (Year: 2017).*

(Continued)

*Primary Examiner* — Kamran Afshar
*Assistant Examiner* — Lokesha G Patel
(74) *Attorney, Agent, or Firm* — NORTON ROSE FULBRIGHT US LLP

(57) ABSTRACT

A method for compressing a deep neural network. The deep neural network includes a multitude of layers, which are each connected on the input side according to a predefinable sequence to their directly preceding layer of the sequence. The method includes adding a skip connection. Thereafter, a reduction of a resolution of the parameters of the layers follows. A computer program as well as to a device for carrying out the method are also described.

9 Claims, 5 Drawing Sheets

| B1 | B2 | acc 32-bit | acc 3-bit |
|---|---|---|---|
| DN (skip-connection) | DN | +++ | ++ |
| DN | VGG | +++ | + |
| VGG (no skip-conn.) | DN | +++ | -- |
| VGG | VGG | +++ | --- |

(56) References Cited

OTHER PUBLICATIONS

Tong, T., Li, G., Liu, X., & Gao, Q. (2017). Image super-resolution using dense skip connections. In Proceedings of the IEEE international conference on computer vision (pp. 4799-4807). (Year: 2017).*

Han, S., Mao, H., & Dally, W. J. (2015). Deep compression: Compressing deep neural networks with pruning, trained quantization and huffman coding. arXiv preprint arXiv: 1510.00149. (Year: 2015).*

Baskin, et al.: "Streaming Architecture for Large-Scale Quantized Neural Networks on an FPGA-Based Dataflow Platform," 2018 IEEE International Parallel and Distributed Processing Symposium Workshops (IPDPSW), (2018), pp. 162-169, arXive: 1708.00052v. 3.

Chakradhar, et al.: "A Dynamically Configurable Coprocessor for Convolutional Neural Networks," Proceedings of the 37th Annual International Symposium on Computer Architecture, (ISCA), France, (2010), pp. 247-257, https://dl.acm.org/doi/abs/10.1145/1815961.1815993.

Shin, et al.: Fixed-Point Performance Analysis of Recurrent Neural Networks, arXiv:1512.01322v3, (2016), pp. 1-5, https://arxiv.org/abs/1512.0132 2v3.

Zhang, et al.: "LQ-Nets: Learned Quantization for Highly Accurate and Compact Deep Neural Networks," arXiv: 1807 .10029v1, (2018), pp. 1-21, https://arxiv.org/abs/1807 .1002 9v1.

Han, et al.: "Deep Compression: Compressing Deep Neural Networks with Pruning, Trained Quantization and Huffman Coding", ICLR 2016, (2016), pp. 1-14, XP055393078.

Minnehan nad Savakis: "Cascaded Projection: End-to-End Network Compression and Acceleration", 2019 IEEE/ CVF Conference on Computer Vision and Pattern Recognition (CVPR), IEEE, Jun. 15, 2019, pp. 10707-10716, XP033687276.

Park, et al.: "Precision Highway for Ultra Low-Precision Quantization", Dec. 23, 2018, pp. 1-10, XP055755858.

\* cited by examiner

COMPRESSING A DEEP NEURAL NETWORK

CROSS REFERENCE

The present application claims the benefit under 35 U.S.C. § 119 of German Patent Application No. DE 102019212912.9 filed on Aug. 28, 2019, which is expressly incorporated herein by reference in its entirety.

FIELD

The present invention relates to a method for compressing a deep neural network, using a skip connection. The present invention furthermore relates to a computer program and to a device, which are each configured to carry out the method.

BACKGROUND INFORMATION

German Patent Application No. DE 10 2018 220 608 A1 describes a machine learning system which includes a multitude of layers. The parameters of those layers which are connected to one further layer in each case have a higher resolution than the parameters of those layers which are connected to a multitude of further layers.

SUMMARY

In a first aspect of the present invention, an, in particular, computer-implemented, method for compressing a deep neural network is provided. The deep neural network may be an already created deep neural network and includes a multitude of layers which are each connected according to a predefinable sequence on the input side to their directly preceding layer of the sequence. A created deep neural network is understood to mean a deep neural network having a fixed architecture or predefined structure. Parameters are assigned in each case to the layers, such as weights or filters, for example. The layers may each be configured to ascertain activations as a function of at least one input variable of the particular layer and as a function of the parameters assigned to the particular layer.

The example method includes the following steps. Adding a skip connection. The added skip connection is then a new, additional connection in the deep neural network, which was not provided for in the created deep neural network. The skip connection additionally connects one of the layers on the input side to a further layer, which is an indirectly preceding layer in the sequence. A preceding layer is a layer which, in the sequence of the layers, is situated in front of the layer which includes the skip connection on the input side. The skip connection ends at the layer which is connected at the input side to the skip connection, and begins at the preceding layer, which is connected by the skip connection to the layer connected on the input side. Thereafter, a reduction of a resolution, in particular, a quantization, of the parameters of the layers follows.

Thereafter, the deep neural network compressed by the reduction of the resolution may be stored in a memory. It shall be noted that at least the parameters are stored in a memory, whereby less memory space is required for storing these parameters with the aid of a reduction of their resolutions. In addition or as an alternative, this deep neural network may then be put into operation. "Putting into operation" may be understood to mean that the deep neural network ascertains a respective output variable as a function of provided input variables.

It was found that, as a result of the skip connection, more pieces of information (partially including redundancies) are transmitted by the deep neural network with the skip connection, whereby a stronger reduction of the resolutions may be achieved compared to the neural network without skip connection. As a result of the addition of the skip connection, the deep neural network may subsequently be more heavily quantized. An advantage of the example method is thus that, as a result of the two described method steps, a particularly memory- and processing-efficient deep neural network may be created.

The example method of the first aspect of the present invention furthermore has the advantage that, as a result of the reduced resolution of the parameters, these parameters may be stored particularly efficiently in the memory with little memory requirement, surprisingly without a capability of the deep neural network being impaired. Furthermore, as a result of the reduced resolution of the parameters and/or of the activations, the processing requirement of this deep neural network may be reduced. For example, by skillfully utilizing the processing architecture and the lower resolution of the parameters, the parameters may be processed in parallel, e.g., by carrying out a 32 bit or four 8 bit computing operations. Another advantage is that, due to the resulting resource-conserving handling, the deep neural network may be used both for stationary (e.g., in computer centers) and for mobile applications (e.g., mobile data processing systems or embedded systems). Such compressed deep neural networks are particularly suitable for processing measured data close to the sensor or in the sensor itself, by which measured data may be compressed and transmitted in a more broadband-efficient manner.

The fact that the lower resolution, in particular, heavier quantization, of the parameters and/or activations does not worsen the capability, in particular, the accuracy of the results of the deep neural network, is due to the additional connections to further, different layers providing differently processed output variables. In this way, that layer which is connected on the input side to multiple layers receives more pieces of information, and the input variables may thus be represented in a better or more completely described state space. As a result, a higher robustness with respect to interferences is achieved, whereby the parameters and activations may be more heavily quantized, for example, without impairing the capability of the deep neural network.

The deep neural network initially created at the beginning of the method may be an already (partially) trained deep neural network. As an alternative, the initially created deep neural network may be a newly initialized, deep neural network. The initially created deep neural network may only include feed-forward connections (feed-forward network), i.e., no skip connections. However, it is also possible that the deep neural network already includes one or multiple skip connection(s) before the method is carried out. The layers may then be connected to one or multiple preceding and/or following layers. A preceding layer is understood to mean the layer which ascertains its output variable chronologically before the respective connected layer, and provides its output variable to the respective connected layer as an input variable. A following layer is understood to mean that layer which receives the output variable of the respective connected layer as the input variable. The advantage when adding further skip connections to a deep neural network which already includes at least one skip connection is that an even stronger reduction of the resolution may be achieved. The reason is that the more paths through the deep neural network, i.e., different skip connections, are present, the more strongly the resolution may be reduced.

Connected on the input side may be understood to mean that an output variable of one of the layers, in particular, of a preceding and/or a following layer, is used as an input variable of the layer connected to this layer.

It shall be noted that a skip connection may be forward-facing and backward-facing. This means that pieces of information may flow along the skip connection in the direction of an information processing direction of the deep neural network, and in the opposite direction to the information processing direction. The information processing direction may be understood to mean the direction of the propagation of the input variables through the deep neural network, i.e., from the input to the output of the deep neural network.

It shall furthermore be noted that, in addition to the parameters, also a resolution of the activations of the layers may be reduced.

In accordance with an example embodiment of the present invention, it is provided that the reduction of the resolution of the parameters is dependent on whether or not one of the layers is directly connected to a multitude of layers on the input side. The reason is that it was found that those layers which include a skip connection on the input side may be more heavily quantized. Based on a heavier quantization, memory space and computing power may be saved. It is therefore furthermore provided that the resolution of the parameters or of the activations of that layer which is directly connected on the input side to a multitude of, in particular, preceding, layers is lower than the resolution of the parameters, or of the activations, of those layers which are directly connected on the input side to exactly one layer.

The resolution may characterize with the aid of how many different possible, in particular, discrete, variables the parameters and/or the activations are represented in each case. In addition or as an alternative, the resolution may characterize a deviation or an accuracy of the variables, e.g., stored in a memory, with respect to the originally ascertained variables of the parameters, for example with the aid of how many bits the variables are represented. In addition or as an alternative, the resolution may characterize a difference between two smallest variables of the parameters and/or of the activations or the difference between two closest, in particular, discrete, variables of the parameters and/or of the activations.

In accordance with an example embodiment of the present invention, it is provided that a number of bits, with the aid of which the parameters are stored, in particular, in a memory, or the activations are represented, characterizes the resolution. It is furthermore provided that the resolution of the parameters or of the activations of that layer which is directly connected on the input side to a multitude of layers is lower by at least more than one bit than the resolution of the parameters, or of the activations, of those layers which are directly connected on the input side to exactly one layer.

The advantage of this is that, as a result of the use of fewer bits for storing the parameters, a smaller memory is required, which allows a more compact design of the deep neural network. Since the energy consumption for storing and reading the parameters and activations is proportional to the number of the bits and, for multiplications, is quadratic to the resolution (in bits) of the parameters and activations, a reduction in the number of the bits, in particular, by a quantization, is particularly computer resource-efficient.

It is furthermore provided that the parameters of the provided deep neural network are already quantized, in particular, based on a predefinable number of bits. The reduction of the resolution of the parameters of the layers is then reduced by a reduction of a word width. The word width may characterize a number of bits for the representation of the quantized parameters. It is also conceivable that the resolution is reduced by a reduction in the number of quantization levels or by a reduction in the number of bits for the representation of the parameters.

A compressed deep neural network is preferably structurally identical to a provided deep neural network, which is why a corresponding resolution of parameters or activations may be understood to mean that the parameters or activations may be found in the same position of the respective other deep neural network having the corresponding resolution.

It is furthermore provided that the skip connection skips a predefinable number of the layers. The predefinable number corresponds to a preferably large value from a value range from, including, the value one to, including, the value of the total number of the layers of the deep neural network, minus the value two or minus the value one. Depending on whether the input and output layers of the deep neural network are taken into consideration, the value one or two will be subtracted accordingly.

An advantage of a preferably large number of skipped layers is that, as a result, pieces of information of one of the layers at the input are preferably forwarded as deep as possible into the deep neural network. In this way, fewer preprocessed pieces of information are available to the deeper layers. The provision of fewer preprocessed pieces of information has a particularly positive effect on the quality of the ascertained output result of the deep neural network.

A preferably large value may be understood to mean that preferably values from the 20% or maximally 10% of the largest values of this value range are selected. It has been found that the advantage which results from a preferably large number of skipped layers is also already yielded when skipping two or more than two layers. A preferably large value may therefore also be understood to mean that this value is greater than or equal to the value of two ($\geq 2$).

It is furthermore provided that the skip connection begins preferably close to the input of the deep neural network, in particular, at one of the foremost layers of the sequence of the layers. It is furthermore provided that the skip connection ends preferably close to the output, in particular, at one of the last layers of the sequence. The foremost layers may be those layers which are situated at the beginning in the sequence of the layers.

In principle, it applies that pieces of information cannot be restored once lost. Since fundamental transformations typically take place in layers close to the input, a loss of information there results in a drastically reduced capability of the deep neural network. In contrast thereto, the last layers are usually only able to squeeze out the last few performance percentage points. Errors in the quantization therefore have a lesser impact in the deeper layers since less already extracted information is lost.

Preferably close to the input of the deep neural network may be understood to mean that the added skip connection begins at one of the layers of the deep neural network situated in a front half of the sequence.

The front half of the sequence is the half encompassing an input layer which receives an input variable of the deep neural network. Accordingly, the rear half of the sequence encompasses an output layer which outputs an end result of the deep neural network. The added skip connection preferably connects a layer of the front half to a layer of the front or of the rear half. It is also conceivable that the added skip connection begins at one of the first 5% or 10% or 20% of the layers of the sequence. The added skip connection particularly preferably begins at the first or second or third layer of the sequence of the multitude of the layers.

It is furthermore provided that the following steps are carried out either before and/or after the step of adding the skip connection and/or after the step of reducing the resolution: providing training data, which in each case encompass input variables and output variables assigned to the input variables. Thereafter, a training of the deep neural network follows. During training, the parameters are adapted in such a way that the deep neural network, in each case as a function of the input variables of the training data, ascertains their respective assigned output variable.

It is possible that the sequence of training and reducing the resolution is executed several times in succession. It is also conceivable that the step of adding a further skip connection is also carried out at least once during the multiple successive executions.

It is furthermore provided that each layer of the deep neural network includes a multitude of neurons, all neurons of each layer being divided into a multitude of groups. Each of the groups is executed on a processing unit assigned to it. The processing unit in each case processes at least one group of a layer or multiple groups of different layers. During training, a multitude of paths through the deep neural network, which includes at least one skip connection, may be selected. The individual paths are then trained as a function of a respective cost function, using that processing unit which executes at least one of the groups of those layers through which the path extends. The paths may be trained separately from one another or superimposed. The paths preferably require different numbers of computing resources (e.g., FLOPs), i.e., encompass different numbers of layers of the deep neural network, for example. During the operation of this, in particular, compressed, deep neural network, it is then possible to deliberately activate the processing units depending on one of the paths. For example, during operation, ideally first as many processing units as possible are deactivated which are not required for the least complex path with respect to computing resources. Thereupon, further processing units (depending on further used paths) may be activated until all processing units are activated which are required for the most complex path with respect to computing resources, e.g., the entire network. As an alternative, a predefinable number of predefinable, in particular, randomly selected, processing units may be deactivated during training. With this procedure, the deep neural network becomes particularly flexible with respect to failures of neurons, and energy-efficient, since arbitrary processing units may be deactivated during the operation of the deep neural network.

It is furthermore provided that the compressed deep neural network is operated according to the division of the neurons among different processing units, it being possible to deactivate individual processing units. The deactivation of the processing units during the operation of the compressed deep neural network may be dependent on an energy budget provided to the deep neural network.

As a result of the distribution of a functionality (all neurons) of the layers of the deep neural network in sub-functionalities (groups of neurons) among a multitude of processing units, energy may be saved during the deactivation of individual processing units. It is now possible to deactivate individual processing units, such as CPUs, whereby effectively individual neurons in the network are deactivated to save energy, without the accuracy of the result drastically declining, in particular, when the deactivation of processing units (neurons) was already taken into consideration during training. As a result of this procedure, a better energy/accuracy compromise may also be achieved.

It is furthermore provided that the compressed deep neural network, which was compressed according to the first aspect, ascertains, as a function of a detected sensor variable of a sensor, an output variable which may thereupon be used to ascertain a control variable with the aid of a control unit.

The control variable may be used to control an actuator of a technical system. The technical system may, for example, be an at least semi-autonomous machine, an at least semi-autonomous vehicle, a robot, a tool, a machine tool or a flying object, such as a drone. The input variable may be ascertained as a function of detected sensor data, for example, and be provided to the machine learning system. The sensor data may be detected by a sensor, such as a camera, of the technical system or, as an alternative, be received from the outside.

In one further exemplary embodiment of the present invention, the deep neural network is configured to classify the sensor data.

In one further aspect of the present invention, a computer program is provided. In an example embodiment of the present invention, the computer program is configured to carry out one of the described methods of the first aspect of the present invention. The computer program includes instructions which prompt a computer to carry out one of these described methods, including all its steps, when the computer program runs on the computer. Furthermore, a machine-readable memory module is provided, on which the computer program is stored. Furthermore, a device is provided, which is configured to carry out one of the methods of the first aspect.

Exemplary embodiments of the above-described aspects are shown in the figures and are described in greater detail below.

DETAILED DESCRIPTION OF EXAMPLE EMBODIMENTS

Figure 1:
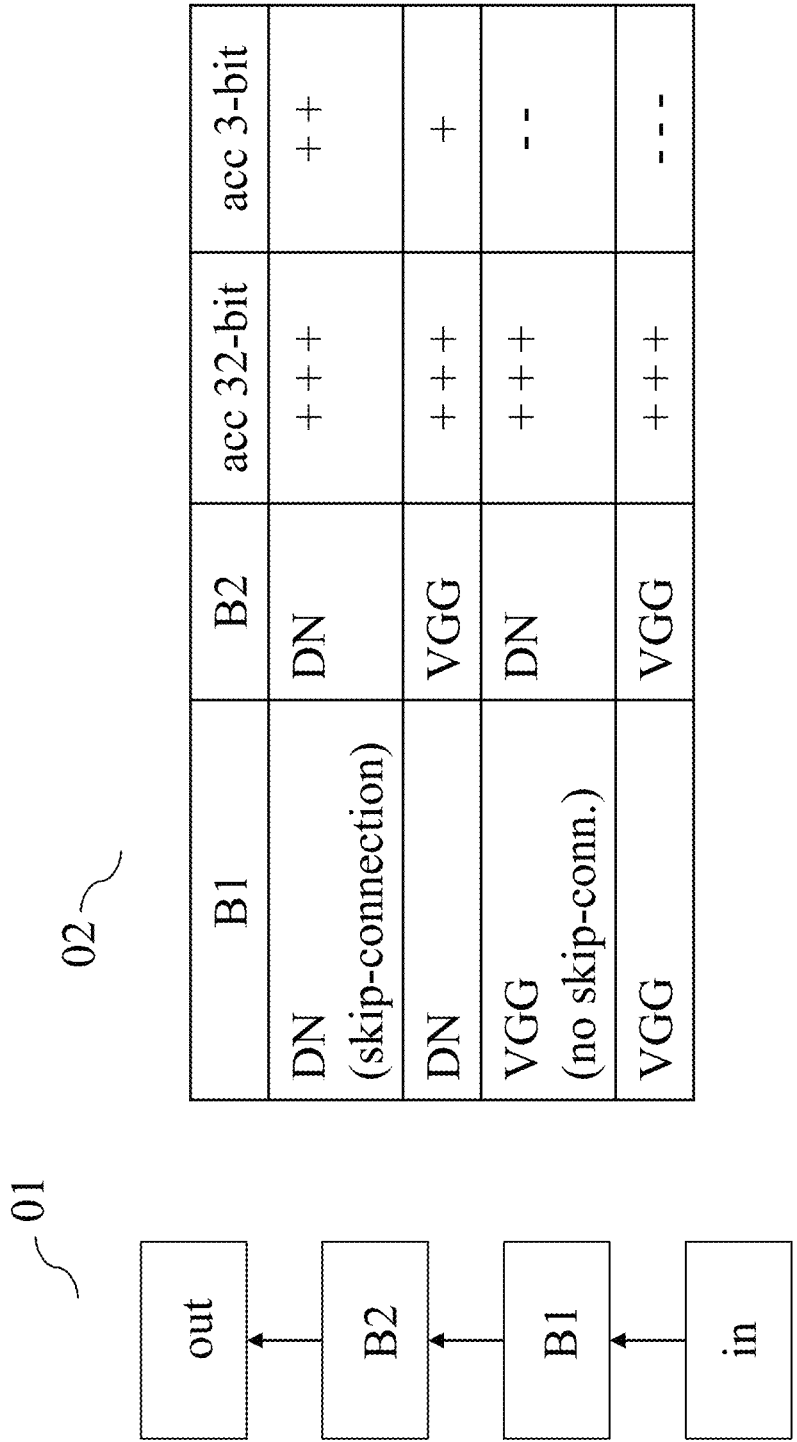
FIG. 1 shows a schematic representation of a deep neural network and a table.

FIG. 1 shows a schematic representation of a deep neural network 01. Deep neural network 01 is represented by four different blocks. A first block (in) schematically represents an input layer of deep neural network 01. The first block is connected to a second block B1. This second block B1 is, in turn, connected to a third block B2 which, in turn, is connected to a fourth block (out). Fourth block (out) schematically represents an output layer of deep neural network 01. Second and third blocks B1, B2 each represent a portion of the hidden layers of deep neural network 01. In a first specific embodiment of second block B1, this block may represent densely connected layers (dense net, DN) which include skip connections. In a second specific embodiment of second block B1, this block may exclusively include forward-facing layers VGG, i.e., no skip connections. The same also applies to third block B2. Table 02 shows accuracy results of deep neural network 01, including differently positioned skip connections within deep neural network 01 and including variably heavily quantized (32- or 3-bit) parameters of deep neural network 01. In the shown table 02 of FIG. 1, the two blocks B1 and B2 as well as a first accuracy (acc 32-bit) and a second accuracy (acc 3-bit) are entered in the first line. First accuracy (acc 32-bit) indicates the accuracy achieved by ascertained results of deep neural network 01 using a parameter resolution of 32 bits, compared to reference data, such as labeled training data. The columns of blocks B1 and B2 therebelow list all four possible specific embodiments of deep neural network 01 including the differently configured layers (DN, VGG). The ascertained accuracies (acc) for different resolutions of the parameters of deep neural network 01 are listed to the right, next to the possible specific embodiments of deep neural network 01. The table clearly shows that it is advantageous when second block B1 includes densely connected layers including a skip connection DN since the accuracy, during a quantization of the parameters with, for example, 3 bits, is still evaluated with one plus (+), whereas the accuracy when using exclusively forward-facing layers without a skip connection VGG for second block B1 is evaluated with double minus (− −) at the same quantization (3 bits). This clearly shows that, with respect to the accuracy of deep neural network 01 having heavily quantized parameters (e.g., using 3 bits), it is important to use skip connections close to the input layer of deep neural network 01.

Figure 2:
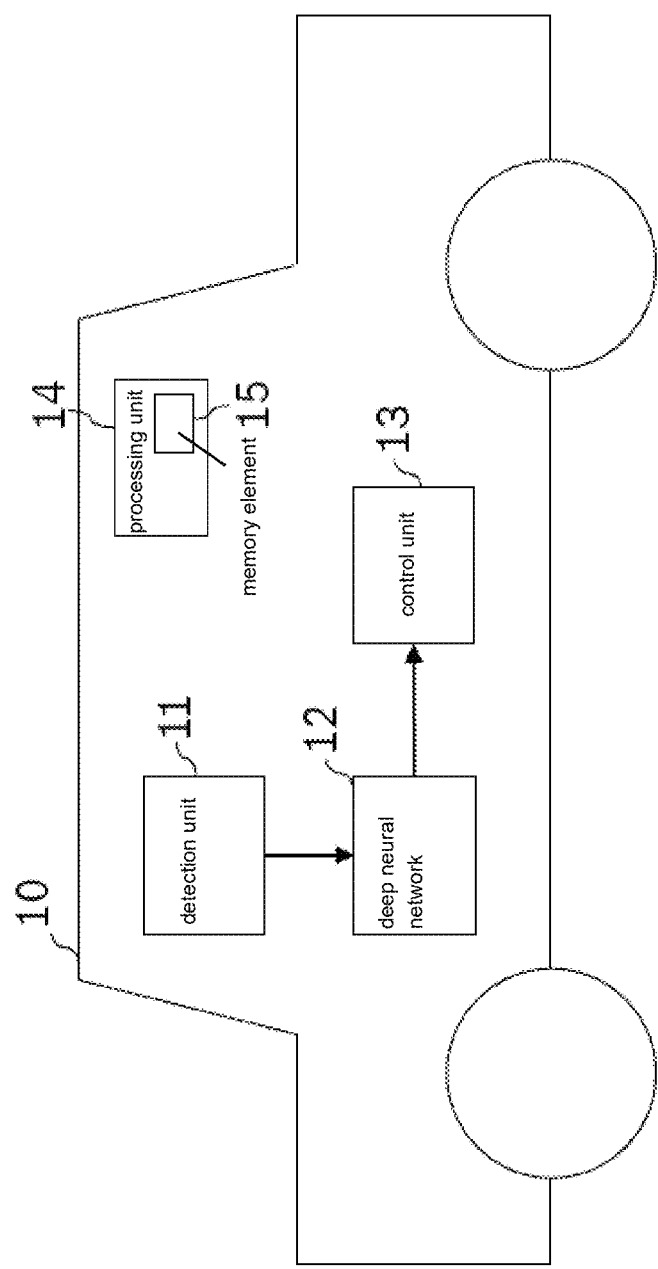
FIG. 2 shows a schematic representation of a vehicle.

FIG. 2 shows a schematic representation of an at least semi-autonomous robot, which in a first exemplary embodiment of the present invention is an at least semi-autonomous vehicle 10. In one further exemplary embodiment, the at least semi-autonomous robot may be a service, assembly or stationary production robot, or, as an alternative, an autonomous flying object, such as a drone.

The at least semi-autonomous vehicle 10 may include a detection unit 11. Detection unit 11 may be a camera, for example, which detects surroundings of vehicle 10. Detection unit 11 is connected to a deep neural network 12, in particular, deep neural network 12 obtainable after carrying out the method according to FIG. 4. Deep neural network 12 ascertains an output variable, as a function of a provided input variable, e.g., provided by detection unit 11, and as a function of a multitude of parameters of deep neural network 12. The output variable may be forwarded to a control unit 13.

Control unit 13 controls an actuator as a function of the output variable of deep neural network 12, and preferably controls the actuator in such a way that vehicle 10 carries out a collision-free maneuver. In the first exemplary embodiment, the actuator may be an engine or a braking system of vehicle 10.

In one further exemplary embodiment of the present invention, the semi-autonomous robot may be a tool, a machine tool or a production robot. A material of a workpiece may be classified with the aid of machine learning system 12. The actuator may be, for example, a motor, which operates a grinding head.

Vehicle 10, in particular, the semi-autonomous robot, furthermore includes a processing unit 14 and a machine-readable memory element 15. A computer program may be stored on memory element 15, which includes commands which, during execution of the commands on processing unit 14, cause deep neural system 12 to be operated with the aid of processing unit 14.

In one further exemplary embodiment of the present invention, deep neural network 12 may be integrated into a sensor or into detection unit 11 to process the detected sensor values with the aid of deep neural network 12. The processed sensor values, with the aid of deep neural network 12, are preferably compressed or already evaluated sensor values, so that these may subsequently be efficiently transmitted to control unit 13, for example. Preferably, at least the parameters are stored on a chip of the sensor in the process, or the deep neural network is integrated into hardware on the chip.

Figure 3:
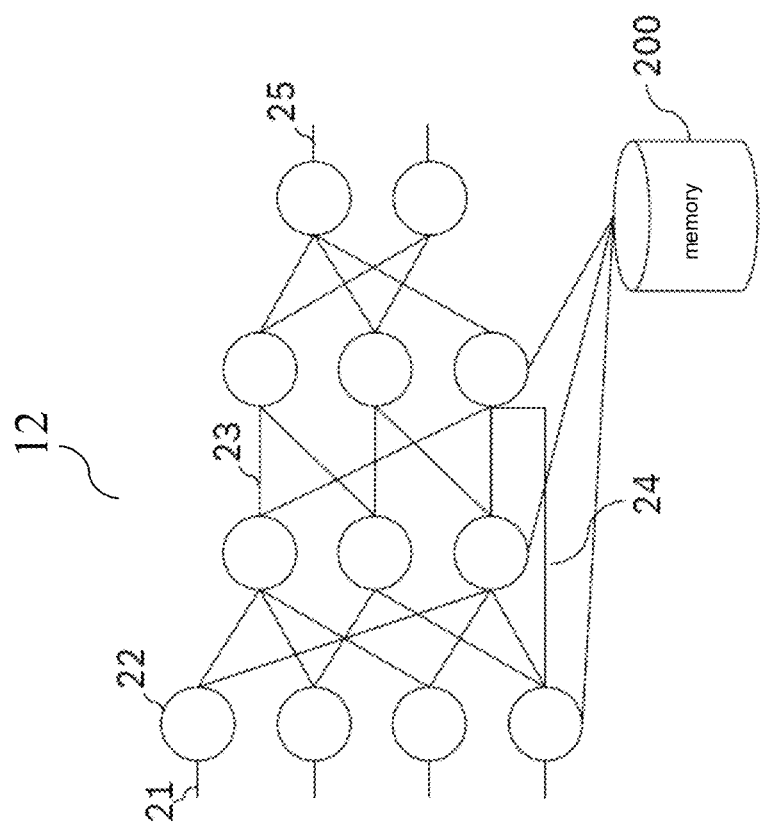
FIG. 3 shows a schematic representation of a deep neural network including a skip connection and a memory.

FIG. 3 shows a schematic representation of deep neural network 12 from FIG. 2, which in this specific embodiment is a deep neural network including four layers. In further specific embodiments, deep neural network 12 may be a convolutional neural network.

Deep neural network 12 includes multiple layers, which are each connected to one another with the aid of connections 23 and each include multiple neurons 22. Deep neural network 12 furthermore includes a skip connection 24. Skip connection 24 in FIG. 3 has the effect that an output variable of the first layer of deep neural network 12 is directly forwarded to the third layer, and is provided as an input variable here. In this way, the second layer is skipped. It shall be noted that skip connection 24 may also be configured in the opposite direction. For example, an output variable of the third layer may be supplied to a preceding layer as an input variable with the aid of a recurrent skip connection.

Deep neural network 12 ascertains an output variable 25 layer by layer as a function of an input variable 21 of deep neural network 12. For this purpose, each layer ascertains an output variable as a function of the input variable provided by it and as a function of the parameters of this layer. The output variable is thereupon forwarded to the further layers by connections 23.

In this exemplary embodiment, the parameters of the respective layers may, by way of example, each include at least one first variable and/or one second variable and a third variable. The layers may each weight the input variable with the aid of the first variable and/or filter the input variable with the aid of the second variable. The layers may add the third variable to the weighted/filtered input variable. This processed input variable is optionally further processed as a function of the parameter with the aid of an activation function (e.g., ReLu).

The parameters, in particular, of the layers, of deep neural network 12 may be stored in a memory 200.

Figure 4:
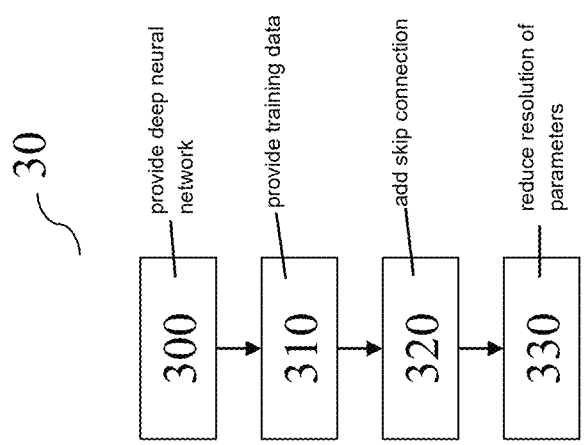
FIG. 4 shows a schematic representation of one specific embodiment of the method for compressing the deep neural network.

FIG. 4 shows a schematic representation of an example method 30 for compressing a provided a deep neural network in accordance with the present invention.

The method begins with step 300. In this step, a deep neural network is provided. The deep neural network may be an exclusively forward-facing neural network which does not include any skip connections. As an alternative, the provided deep neural network may also be a forward-facing neural network which includes at least one skip connection. The provided deep neural network may be an already (pre-)trained or a newly initialized deep neural network. Parameters of the layers of the deep neural network may have a high resolution, for example 32 bits.

The following step 310 may optionally be carried out after step 300. In this step, training data are provided to the, in particular, newly initialized, deep neural network. The training data preferably encompass training input variables and respective assigned training output variables (labels). The training input variables may, for example, be images of a camera, and the training output variables may, for example, be a classification or segmentation of the camera images. In addition or as an alternative, the training data may encompass a multitude of labeled sound sequences, text excerpts, radar, LIDAR or ultrasonic signals. Thereafter, in step 310, the deep neural network is trained based on the provided training data. During the training of the deep neural network, the parameters of the respective layers are adapted in such a way that the deep neural network ascertains the respectively assigned output variables, as a function of the provided training input variables.

The training is preferably carried out as a function of a cost function, which characterizes a difference between the ascertained output variables and the training output variables, for example. The cost function may be optimized with respect to the parameters with the aid of a gradient descent method. In the case of the gradient descent method, the cost function is iteratively optimized, usually a gradient having a resolution of 32 bits being used. The parameters may be adapted as a function of the gradient, whereby the cost function changes so that it is ideally minimized or maximized. Since the gradient usually has a resolution of 32 bits, the adapted parameters are stored in memory 200, as a function of the gradient, preferably with a resolution of 32 bits.

After step 300 or optional step 310 has been ended, step 320 is carried out. In step 320, a skip connection is added to the provided deep neural network. The skip connection is preferably added to the deep neural network in such a way that it begins at a layer close to the input layer of the deep neural network and/or skips preferably a large number of layers.

After the skip connection was added in step 320, the subsequent step 330 follows. In this step, a resolution of the parameters of the deep neural network is reduced. The reduction of the resolution of the parameters preferably takes place by a quantization of the parameters. If the deep neural network was trained according to optional step 310, the parameters each have a resolution of 32 bits. In step 330, for example, the resolution may then be reduced from 32 bits to 16, 8, 4 or 3 bits. In addition to the quantization of the parameters, the resolution of the activations may be reduced, preferably relative to the quantization of the parameters of the particular layers.

The quantization of the parameters may be carried out with the aid of a linear quantization, but also using a non-linear quantization, for example a logarithmic quantization. In addition to the described deterministic quantizations, stochastic quantizations are also conceivable.

For example, the quantization of the parameters and/or of the activations may be carried out in such a way that all layers have the same quantization, for example a quantization with 8 bits. As an alternative, those parameters of the layers which are connected to multiple further layers may deliberately be more heavily quantized, for example with 5 bits.

After the resolution of the parameters was reduced, the parameters having a reduced resolution after step 330 may be stored in memory 200. It is possible that the deep neural network is trained after step 320 and before carrying out step 330.

With this, method 30 ends. It shall be noted that steps 310 through 330 may be cyclically repeated several times in succession until a predefinable abort criterion is met. When using multiple batches of training data, the deep neural network may optionally be trained again after step 330 has ended, using the newly stored parameters, for example for a further batch, starting with step 310.

Figure 5:
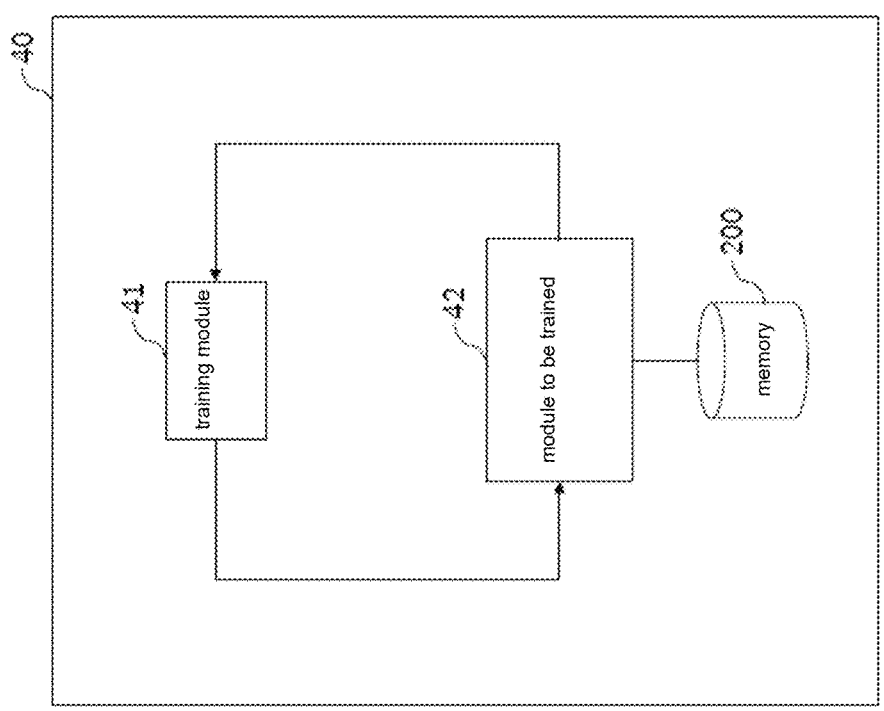
FIG. 5 shows a schematic representation of one specific embodiment of a device which may be used to train the deep neural network.

FIG. 5 shows a schematic representation of a device 40 for training deep neural network 12, in particular, for carrying out step 310 for compressing deep neural network 12. Device 40 includes a training module 41 and a module 42 to be trained. This module 42 to be trained includes deep neural network 12. Device 40 for training deep neural network 12 trains deep neural network 12 as a function of output variables of deep neural network 12, and preferably using predefinable training data. During the training, parameters of deep neural network 12 stored in memory 200 are adapted.

What is claimed is:

1. A method for compressing a deep neural network, the deep neural network including a multitude of layers, which are each connected on an input side according to a predefinable sequence to their directly preceding layer of the predefinable sequence, parameters being assigned to each layer, the method comprising:

adding, by executing computer instructions, a skip connection to the deep neural network, the skip connection connecting one of the multitude of layers on the input side to a further layer in the neural network which is an indirectly preceding layer in the predefinable sequence; and reducing, by executing the computer instructions, a resolution of at least one of the parameters of the layers, wherein the resolution is reduced only for the parameters of the one of the multitude of layers on the input side that is connected to the further layer; and wherein the parameters are quantized, and the resolution of the parameters of the layers is reduced by reducing a number of bits for representing each of the quantized parameters, a resolution of the parameters of that layer which is directly connected on the input side to a multitude of preceding layers being lower than a resolution of the parameters or of the activations of those layers which are directly connected on the input side to exactly one layer.

2. The method as recited in claim 1, wherein the skip connection skips a predefinable number of the layers, the predefinable number corresponding to a value from a value range from and including a value of one to and including a value of a total number of the layers of the deep neural network, minus the value one.

3. The method as recited in claim 1, wherein the skip connection begins at a layer of a multitude of front layers of the predefinable sequence of the layers close to an input of the deep neural network, the multitude of the front layers encompassing a predefinable number of layers connected in succession, beginning at an input layer of the deep neural network.

4. The method as recited in claim 1, wherein each layer of the deep neural network includes a multitude of neurons, all neurons of each layer being divided into a multitude of groups, and each of the groups being executed on a respective processing unit assigned to the group, and the respective processing units each executing at least one group of one of the layers or multiple groups of different layers, and at least one of the respective processing units being deactivated during operation of the deep neural network, during propagation of an input variable.

5. The method as recited in claim 4, further comprising the following steps:

providing training data, which in each case encompass input variables and output variables assigned to the input variables; and training the deep neural network, wherein during the training, the parameters are adapted in such a way that the deep neural network, in each case as a function of the input variables of the training data, ascertains assigned output variables.

6. The method as recited in claim 5, wherein predefinable ones of the processing units are deactivated during the training.

7. The method as recited in claim 1, wherein the skip connection includes a first endpoint and a second endpoint, and wherein the first endpoint and the second endpoint are present only in the neural network.

8. The method as recited in claim 1, wherein an extent by which the resolution is reduced increases as more skip connections are added to the skip connection.

9. The method as recited in claim 1, wherein the resolution is reduced by a word width.

* * * * *